United States Patent

Saner

[11] 3,763,971
[45] Oct. 9, 1973

[54] TILTPROOF DAMPING APPARATUS
[75] Inventor: Kaspar Saner, Dubendorf, Switzerland
[73] Assignee: Wirth, Gallo & Co., Zurich, Switzerland
[22] Filed: May 9, 1972
[21] Appl. No.: 251,841

[30] Foreign Application Priority Data
June 9, 1971  Switzerland.................. 8583/71

[52] U.S. Cl................................. 188/322, 277/135
[51] Int. Cl.................................... F16f 9/36
[58] Field of Search.......... 188/297, 311, 322; 277/135

[56] References Cited
UNITED STATES PATENTS
2,215,449  9/1940  Alexander et al. ............. 277/135 X
2,663,385  12/1953  Waterston....................... 188/322

FOREIGN PATENTS OR APPLICATIONS
72,340  11/1959  France............................. 188/322

Primary Examiner—George E. A. Halvosa
Attorney—Stevens, Davis, Miller & Mosher

[57] ABSTRACT

A tiltproof damping apparatus is comprised of a pot, a piston rod and a piston. A closure member is provided for one end of the pot and is fitted therein with slight clearance. The piston rod extends through an aperture in the closure member with limited clearance therebetween. Liquid means is received within the pot and a meniscus of the liquid means is formed on the outside of the closure member about each clearance.

5 Claims, 4 Drawing Figures

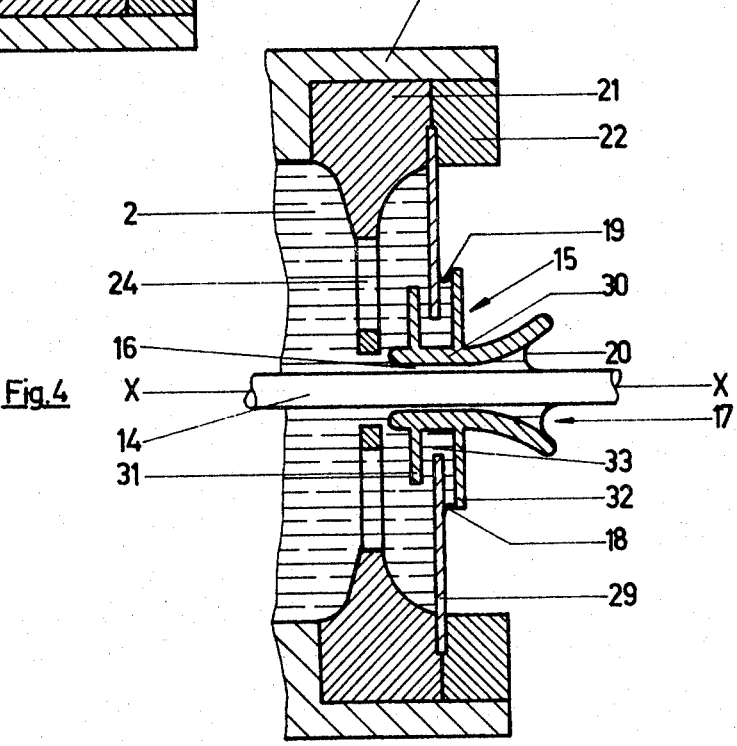

TILTPROOF DAMPING APPARATUS

This invention relates to a tiltproof damping apparatus of the kind which comprises a pot with a viscous liquid and a piston which is immersed in the viscous liquid and is provided with a piston rod, the piston being movable relative to the pot in the direction of the piston rod axis. Damping apparatuses of this kind are known, for example for use with weighing balances and dynamometers.

Open, rotation-symmetrical damping apparatuses are also known, consisting of an open pot provided with a flow restrictor an immersed element or piston, which may possibly be equipped with a further flow restrictor, and a suitable amount of viscous oil. Damping apparatuses of this kind mainly operate with the axis of the piston rod and may only be tilted over on particular and relatively rare occasions, for example when the damping apparatus is being conveyed from one place to another. In the course of the tilting action the oil moves within the pot. That is to say, owing to the provision of the flow restrictors, either no oil, or only a very small amount of oil, will seep out from the annular opening between the edge of the pot and the rod of the immersed element.

Also known in the art are closed, rotation-symmetrical, viscous damping apparatuses, which consist of a pot, an immersed element, and an annular diaphragm between the edge of the pot and the rod of the immersed element. The inner space, which is thus closed, is filled as completely as possible with viscous oil. Damping apparatuses of this kind can operate in any position and, naturally, are tiltproof.

Closed damping apparatuses are also known in which the immersed element or piston has a through-going rod. Accordingly, the damping apparatus has two sealing diaphragms between the pot and the rod of the immersed element.

The above-mentioned damping apparatuses are unsatisfactory for different reasons; or their range of practical application is, in each instance, limited by the particular features of the equipment concerned. In the case of open damping apparatuses the effectiveness of the flow restrictors can only be ensured for relatively free-flowing (low-viscosity) oils, for example those of a viscosity below 1,000 centistokes. In the case of higher viscosity oils, on the other hand, high oil losses result if the equipment is tilted. Open damping apparatuses can only be operated when vertically positioned. Closed damping apparatuses are, in principle, endowed with a restoring force which is inversely proportional to the deviation of the axial position of the immersed element from the rest position (which is only partially susceptible to being calculated) of the immersed element.

The aim of the invention is to provide a damping apparatus which is tiltproof even in the case of highly viscous oils, and in which only very small restoring forces are effective between two structures (i.e., between the pot and the immersed element).

Thus, the invention has the object of securely retaining the oil in the pot of the damping apparatus irrespective of the position of the latter relative to the ground, and without the provision of sealing elements which entail a large amount of friction or a restoring force.

According to the invention a tiltproof damping apparatus comprises a pot containing a viscous liquid, a piston in the pot, a piston rod attached to the piston, the piston and rod being movable in the axial direction of the piston rod, and a closure member which is fitted into the pot with a first clearance and has a central opening with a second clearance through which the piston rod passes, in which the clearance between the closure member and the pot is smaller in the direction of the rod axis than in the direction perpendicular to the rod axis, the clearance around the piston rod in the direction perpendicular to the rod axis is not greater than the clearance around the closure member in the direction of the rod axis, and each clearance containing a meniscus of the liquid on the outside of the closure member.

Embodiments of the invention are diagrammatically illustrated, in vertical cross-section, in the accompanying drawings, in which:

FIG. 3 is a modification of the embodiment illustrated in FIG. 2; and

FIG. 4 illustrates a third embodiment of the invention.

Figure 1:
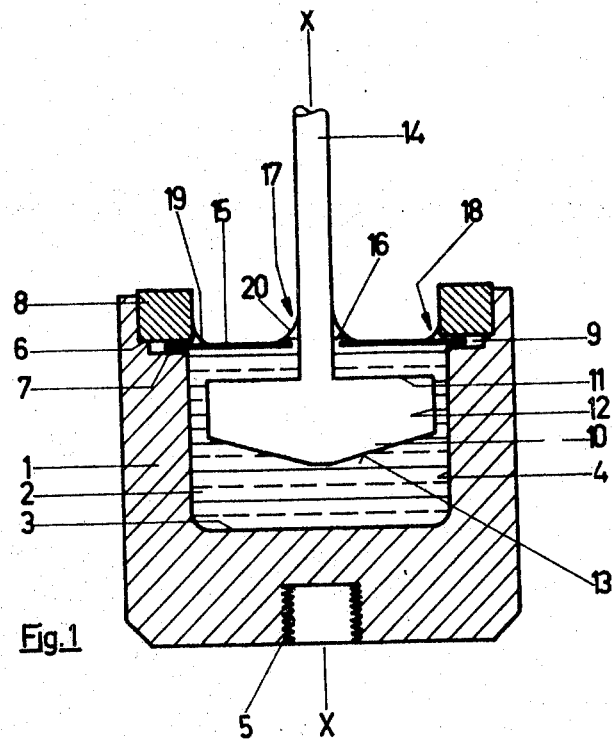
FIG. 1 shows a first embodiment of the invention.

The embodiment illustrated in FIG. 1 shows a damping apparatus which is symmetrical in rotation relative to the axis XX. The pot 1 is cylindrical and has an inner chamber 2, formed with a bottom 3 and with a side wall surface 4. On the lower side of the pot 1 is a screw-threaded bore 5, which serves to secure the pot 1 to a part of the apparatus (not shown) which is to be damped. The pot 1 has shoulder surfaces 6, 7 at its upper end. An annular collar 8 is supported on the shoulder surface 6, so that an annular groove is formed between the lower surface of this collar and the shoulder surface 7. The piston 10, immersed in the liquid in the pot, has an upper surface 11, a cylindrical side wall surface 12, and a bottom 13, and is attached to a piston rod 14. A closure member 15 lies in the groove 9. This closure member 15 has, in the embodiment illustrated, the form of a disc which is provided with a central opening. Thus, the assembly has two passages 17, 18, through which a viscous liquid such as oil, contained in the inner chamber 2, can pass. The rod 14 of the immersed piston 10 can freely move axially through the passage 17, but can only move subject to a very restricted clearance in the direction perpendicular to the axial direction. In contradistinction to this, the closure member 15 can only move subject to a limited play in the axial direction within the passage 9, the available clearance being greater in the direction perpendicular to this axial direction. At the two passages 17, 18 the oil forms two annular meniscuses 19, 20 on the outside of the closure member 15. When, as in the case of this embodiment, the closure member 15 consists of a disc, this disc may either be of rigid construction — that is to say it can only deform to a negligible extent in response to the forces acting on it — or it may be of elastic construction. A disc of elastic construction will be bent by the above-mentioned forces. In both instances, however, the closure member 15 will carry out its allotted function, both when the piston 10 is stationary and also when it is moving axially.

Let consideration be first given to the case of a disc of rigid construction, when the rod 14 is stationary; under these conditions — and assuming that there is a suitable amount of oil — the disc will be moved downwardly, because the meniscus 19, 20, or the capillary force active at the surface of the oil in the two meniscuses 19, 20, tends to draw the oil out from the inner chamber 2. So long as the dimensions of the meniscuses 19, 20 are small, relative to the diameter of the rod 14, the surface tension will be about the same at both meniscuses, if the cross-sections of the latter are the same. This means that the two meniscuses 19, 20 must have approximately the same cross-section, if it is to be ensured that there will be no fluid exchange of oil between these meniscuses by way of the inner chamber or space 2.

When there is axial movement of the piston 10, the desired viscous forces will be effective between the wall surface 12 of the piston 10 and the wall surface 4 of the pot 1. The forces effective between the piston 8, or its rod 14, and the closure member 15 are smaller. This is because only very small quantities of oil move at the edges of the closure member 15, that is to say through the opening 16 and through the groove 9. These latter-mentioned quantites of moving oil correspond to the volume of the immersed part of the piston rod 14, or to the alteration in speed of this immersed part of the piston rod 14. These movements may, however, take place in different ways. Thus, if the closure member 15 is in perfect contact with the shoulder surface 7, then no movement of oil through the groove 9 will be possible and the fluid exchange will take place through opening 16. The result of this state of affairs, is that, for downward movement of the piston 10 and for a proportional outward delivery of oil this procedure can take place for an unlimited period of time from the point of view of the oil reserve present. on the other hand, in the case of upward movement of the piston 10, this procedure can only be prolonged until the meniscus 20 has completely collapsed. Air will begin to enter the chamber 2 from this instant.

However, in practice the contact between the closure member 15 and the shoulder surface 7 is not perfect. This is because the shoulder surface 7 has irregularites, which allow oil to pass through under all conditions. Under these circumstances the meniscus will be correspondingly built up and collapsed. As the cross-sections of the two meniscuses are about the same in the stationary condition, the oil volume in the meniscus 19 is much greater than that in the meniscus 20. It is, therefore, advantageous to dimension the passage round the rod 14 very small, and the passage through the groove 9 very large. In this way it is possible, for a given diameter of the piston rod 14 and for a given volume of the two meniscuses 19, 20, to provide a longer path of travel for the piston 10. In other words the meniscuses 19, 20, are only stable when they are of small size. If the meniscuses are small, and if the piston rod 14 is of minimal dimensions, the piston 10 can be allowed to move upwards until all the oil present in the meniscus 19 has been sucked into the chamber defined by the pot. This is subject to the condition that the meniscus 20 alters more slowly and does not, therefore, constitute a narrower barrier for the procedure described ; this condition is, in fact, satisfied if the hydraulic impedance per unit length of the opening 16 is selected to be greater than that of the groove 9.

If the closure member 15 consists of an elastic disc, that is to say of a disc which will bend in response to the forces applied to it, then, when the piston 10 is in motion, the viscous forces in the groove 9 and in the opening 16 will be appreciably reduced with respect to the corresponding forces effective in the case of a disc of rigid construction Thus, if the piston 10 is in motion, and if a corresponding alteration were to take place in the inner chamber of the damping apparatus (the disc being assumed to be of rigid construction) then a condition of overpressure would exist. However, the closure member 15 can deform, in the following manner:

As the viscous connection between closure member 15 and piston rod 14 is stronger than the elastic forces of the closure member 15, the centre of the closure member 15 is not shifted relative to the piston rod 14, but follows the latter in its downward path of travel.

Also, as there is no flow of oil through the groove 9, because the pressure is insufficient for this (and as, moreover, an alteration in volume is required) the centre portion of the closure member 15 is raised by a proportional amount.

Under these circumstances, that is to say, with a disc of elastic construction, with suitable meniscuses 19, 20, and with the closure member 15 in stationary condition in contact with the shoulder surface 9, the piston 10 can execute rapid movements without these meniscuses being caused to alter. However, when the piston executes slow movements, it can no longer be assumed that the amount of oil flowing will be small. This is because the elastic forces of the closure member 15 last for a sufficiently long time to allow oil to pass through the small openings until the closure member 15 is relieved of tension and once again assumes a flat condition. This means that, when the piston 10 is executing relatively rapid movements, it is necessary, for the purpose of preventing the formation of air bubbles in the main chamber 2, to make the passage 18 more amenable, per unit area thereof, to seepage of oil therethrough than is passage 17. Naturally, this state of affairs is more difficult to realize in the case of a closure member 15 of rigid construction than with a closure member 15 of elastic construction. This is because an elastic closure member will be better able to conform to the shape of the annular collar 8. Fine surface irregularities should, therefore, be provided on the shoulder surface 7, or grooves should be present on the edges of the closure member 15.

Figure 2:
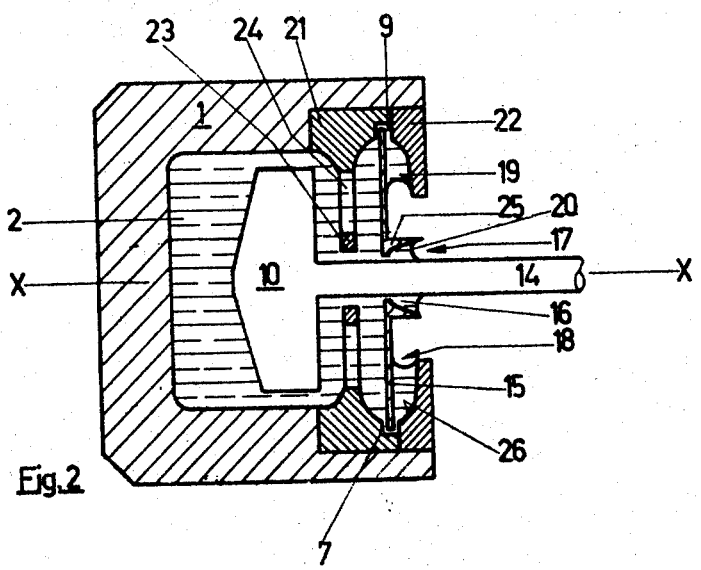
FIG. 2 shows a second embodiment in which the piston, which is immersed in the viscous liquid, lies on its side.

A second embodiment is illustrated in FIG. 2. In this second embodiment the damping apparatus can function with a horizontally disposed piston rod 14. The inner chamber 2, defined by the pot 1, is closed off by a ring 21, an annular collar 22, and by a closure member 15. The ring 21 has a central opening 23 for the piston rod 14, and openings 24. Oil can pass through these openings. The shoulder surface 7 is located on the outside of the ring 21 and, with the inside of the annular collar 22, defines the groove 9. The closure member 15 is formed with a collar 25, which surrounds the opening 16. In this case, also, the available clearance is comparatively limited, transversely of the axis XX, in the passage 17, whereas the piston rod 14 can move freely in the direction of this axis XX. By contrast, in the passage 18 the clearance available in the direction of axis XX is relatively small in comparison with the clearance present transversely of this axis XX. When the damping apparatus is horizontal, the annular meniscus 20 is, therefore, in a condition of equilibrium when it lies obliquely. This is because the static oil pressure between the upper and lower parts of this meniscus 20 is compensated by the oblique position of the meniscus. The hydrostatic pressure difference is proportional to the diameter of the annular meniscus and is, therefore, not very large in the case of damping apparatuses of small diameter. It is a condition for the maintenance of the meniscus 20 that it shall produce a corresponding capillary force which is larger than the pressure difference between the meniscus 20 and the lower part of the meniscus 19. Otherwise, the oil could flow from meniscus 20 to meniscus 19. Owing to the fact that the inner surface 26 of the annular collar 22 is of a suitable shape, the upper part of meniscus 19 does not flow downwards (i.e., along the meniscus itself). The meniscus 19 is, in this way, maintained at its maximum size.

FIG. 3 illustrates a modification of the embodiment illustrated in FIG. 2. The closure member 15 has a second annular collar 27, whose outer wall is conical in cross-section, although the inner surface 28 of the annular collar 22 is cylindrical. The meniscuses 19, 20 behave in the manner illustrated with reference to FIG. 2.

FIG. 4 illustrates a further embodiment of the invention. A rigid disc 29, having a central hole, is secured between the two rings 21, 22. The closure member 15 consists of a cylindrical sleeve 30, which is outwardly flared. This cylindrical sleeve 30 is formed with two flanges 31, 32, between which lies the edge of the central hole of the disc 29. The recess 33 formed by these flanges corresponds to the groove 9 of the other embodiments, and defines the passage 18. The central opening 16 of the sleeve 30 defines the passage 17. The clearance, in the direction extending transversely of axis XX, in the passage 17, is small, whereas the rod can move freely in the direction of axis XX. By contrast, the play in the direction of axis XX is smaller in the passage 18 than that present in the direction lying perpendicular to the direction of axis XX.

A pressure is created in the inner chamber 2 when the piston rod 14 moves axially (in the direction XX). Oil flows from the inner chamber 2, through opening 16 and recess 33, to the meniscuses 20 and 19, or in the opposite direction. This oil movement creates an additional damping force. When the piston rod moves laterally, the closure member 15 will follow, in a large measure, the rod 14, this closure member 15 moving in the direction lying perpendicular of axis XX. This is because there is a sufficient lateral clearance between the closure member 15 and disc 29.

This embodiment affords particular advantages. The static pressure differences, which determine the outflow of oil when the meniscus is obliquely positioned, are now only limited by the diameter of the meniscus 19. Further, the relationship between the volume of the two meniscuses 19, 20 corresponds to that between a central meniscus and an edge meniscus, shown in FIGS. 1 to 3. The volume of meniscus 19 for the oil exchange can be kept sufficiently large in accordance with the maximum working stroke of the piston occurring in practice. The condition remains satisfied that the volume of the smaller meniscus 20 shall not increase, as a percentage, more rapidly than the large meniscus. Thus, no air bubbles are admitted into the inner chamger through the opening 16 before the piston has reached its fully extended, or outwardly directed, position, that is to say before the meniscus 19 has fully collapsed.

The above-described damping apparatus affords, inter alia, the following advantages :

instead of the elastic restoring forces of the closed damping apparatuses of the known forms of construction, only the forces exerted by the meniscuses are present, in the stationary condition of the piston, between the pot and the piston.

Under dynamic working conditions, and when the closure member is of a relatively rigid construction, and additional viscous transient force will appear, owing to the fact that the length of the part of the piston rod which is immersed in oil alters, and this produces a condition of overpressure in the oil chamber, so that movement of oil is causes. However, all these movements only continue so long as the damping apparatus is subject to dynamic conditions. Thus, when the piston rod executes reciprocatory motions, alternating damping forces will be exerted. However, these damping forces will be small in comparison with the damping forces produced by the movements of oil between the pot and the piston. It is a matter of importance to ensure that these forces do not have any residual or continued effect at the end of the movement.

Alternating forces hardly occur at all in the case of damping apparatuses which are equipped with elastic closure members. Damping apparatuses of this kind can also be used in their horizontal position. This is because the working position assumed by the damping apparatus is substantially unaffected by which part of it is filled with oil.

The qualities and characteristics of the damping apparatus principally depend on the surface tension, and not on the viscosity of the oil. This means that oils of very high viscosity can be used, in which the damping constant is very high per unit volume. This enables the size of the damping apparatuses to be kept at a minimum.

I claim:

1. A tiltproof damping apparatus comprising a pot containing a viscous liquid, a piston in the pot, a piston rod attached to the piston, the piston and rod being movable in the axial direction of the piston rod, and a closure member which is fitted into the pot with a first clearance and has a central opening with a second clearance through which the piston rod passes, in which the clearance between the closure member and the pot is smaller in the direction of the rod axis than in the direction perpendicular to the rod axis, the clearance around the piston rod in the direction perpendicular to the rod axis is not greater than the clearance around the closure member in the direction of the rod axis, and each clearance contains a meniscus of the liquid on the outside of the closure member.

2. An apparatus according to claim 1 in which the pot is closed by a disc formed with a central hole and the closure member comprises an elongate sleeve having two spaced flanges, the edge of the central hole lying between the flanges and forming, with these flanges, the first clearance in which the first meniscus is formed, the piston rod extending through the sleeve and, with the sleeve, forming the second clearance in which the second meniscus is formed.

3. An apparatus according to claim 1 in which the pot has a recessed edge, comprising an annular collar seated in the recess, the recess and the collar defining an annular groove in which the outer edge of the closure member is contained, the closure member consisting of a disc having a central opening, the first meniscus lying between the disc and the inner surface of the annular collar, and the second meniscus lying in the gap between the edge of the central opening and the piston rod.

4. An apparatus according to claim 3 in which the closure member is formed with an inner ring and the second meniscus is located between the ring and the piston rod.

5. An apparatus according to claim 4 in which the closure member has within the first clearance an outer ring and the cylindrical inner end face of the annular collar.

* * * * *